United States Patent [19]

Van Beek et al.

[11] Patent Number: 4,920,089

[45] Date of Patent: Apr. 24, 1990

[54] HYDROGENATION CATALYST

[75] Inventors: Wilhelmus P. Van Beek, Vlaardingen; Wilma Den Hoed, Papendrecht; Willem A. Van Leeuwen, Vlaardingen; Eduard K. Poels, Leyden; Cornelis Visser, Zwijndrecht, all of Netherlands

[73] Assignee: Unilever Patent Holdings B.V., Rotterdam, Netherlands

[21] Appl. No.: 192,217

[22] Filed: May 3, 1988

[30] Foreign Application Priority Data

May 8, 1987 [EP] European Pat. Off. ........ 87200855.2

[51] Int. Cl.$^5$ .......................... B01J 21/04; B01J 23/74
[52] U.S. Cl. ..................... 502/335; 502/527; 208/143; 208/216 PP
[58] Field of Search ............... 502/332, 335, 337, 259, 502/527; 208/143, 216 PP

[56] References Cited

U.S. PATENT DOCUMENTS

| | | | |
|---|---|---|---|
| 4,081,353 | 3/1978 | Kehl et al. | 208/216 |
| 4,160,745 | 7/1979 | Murrell et al. | 502/337 |
| 4,317,748 | 3/1982 | Torok et al. | 502/337 |
| 4,424,163 | 1/1984 | Rosen | 502/337 |
| 4,456,703 | 6/1984 | Aldridge et al. | 502/335 |
| 4,490,480 | 12/1984 | Lok et al. | 502/315 |
| 4,495,307 | 1/1985 | Clements | 502/305 |
| 4,514,520 | 4/1985 | Uytterhoeven | 502/527 |
| 4,519,951 | 5/1985 | Qualeatti et al. | 260/413 |
| 4,670,416 | 6/1987 | Klimmek et al. | 502/259 |

FOREIGN PATENT DOCUMENTS 1528413  10/1978  United Kingdom ............... 208/112

*Primary Examiner*—Anthony McFarlane
*Attorney, Agent, or Firm*—Cushman, Darby & Cushman

[57] ABSTRACT

The invention provides a nickel upon transition alumina catalyst containing 5–40% ww of nickel, with an active nickel surface area between 80 and 300 m$^2$/g of Ni, with a transition alumina that satisfies the following X-ray diffraction pattern:

| d ($10^{-10}$ m) | I/Io |
|---|---|
| 1.39 | 100 |
| 2.85 | 75–85 |
| 2.72 | 60–80 |
| 2.43 | 70 |
| 2.01 | 45–80 |

Preferably, the BET total surface area of the catalyst is between 50 and 200 m$^2$/g catalyst and is substantially free from pores with a radius below 2.0 nm.

Also, a process is provided for hydrotreating unsaturated hydrocarbons, in which unsaturated hydrocarbons are treated with hydrogen in the presence of a catalyst as defined above.

5 Claims, 2 Drawing Sheets

HYDROGENATION CATALYST

The invention relates to a nickel upon transition alumina catalyst, and more in particular to such a catalyst with a nickel content of 5-40% ww and an active nickel surface area between 80 and 300 $m^2/g$ of nickel.

Many catalysts are of the type of a metal which has been dispersed as the active phase on a carrier or support material and, confining outselves to petroleum chemistry, many carrier materials have been proposed. In the Oil and Gas Journal of Oct. 5 (1987), pages 41–78, the following supports have been named: alumina, gamma-alumina, alpha-alumina, zinc aluminate, calcium aluminate, magnesium aluminate, alumina-molybdenum oxide, amorphous and crystalline silica-aluminas, molecular sieves/zeolites, zeolite-aluminas, kieselguhr/diatomaceous earth, activated carbon, polystyrene-divinylbenzene copolymers, pumice and sepiolite.

More specifically, nickel upon transition alumina and, more in particular, gamma-alumina are known from US-A-4 490 480 (Octropa B.V.). These catalysts, however, have a relatively small pore radius and not a very high active nickel surface area. Consequently, with substrate material of a high molecular weight transport (intra-particle diffusion limitation) problems occur so that the active nickel area is not completely available for hydrogenation reaction.

US-A-4 081 353 (Kehl et al.) discloses a process for the hydrodesulphurisation of a sulphur-containing charge-stock, using a catalyst comprising 2-25 weight percent of a metalliferous hydrogenation component on an alumina hydrate with x-ray diffraction peaks at 2 theta=14° and, judging from the figures in this patent, 2 theta=about 28° and 38°. This pattern is typical for AlOOH, i.e. boehmite(ZCPPS file 21-1307). The peak at 2=14° is the most intense peak in the x-ray diffractogramme of the boehmite; this peak is not found in the x-ray diffractogramme of theta-alumina.

GB-A-1 528 413 (Batty et al.) discloses a process for the production of white oils of DAB 7 quality (DAB=Deutsche Pharmakopoeia, 7th Ed.). Especially the second stage hydrogenation process described is interesting. In this process, applying a nickel-containing catalyst supported on sepiolite is used. Sepiolite is a naturally occurring mineral (which can also be prepared via a synthetic route), mainly consisting of magnesium silicate.

US-A-4 495 307 (Clements et al.) discloses catalytic particles shaped as a cylinder of polylobate cross-section having bluntly rounded, concave, interlobar interstices. The aim of such forms is to extend the particle surface to volume ratios beyond those encountered in simple cylindrical or spherical forms. Thus, the liquid hold-up in trickle flow operation processes is increased, also extending the residence time for the reactions improving the effectiveness of the catalyst. Oxides mentioned are alumina, silica and silica-alumina with one or more active, metallic components selected from Group VI and Group VII of the Periodic Table of the Elements. The catalysts mentioned in the examples of this citation mostly possess a BET surface area above 150 $m^2/g$. It is therefore necessary to investigate the catalyst preparation method referred to, viz US-A-3 232 887 (Pessemisis et al. In this document the preparation is described of a number of catalysts containing at least one metallic element from Group VI of the Periodic Table and at least one element from Group VIII of the periodic table and at least a stabilizing amount of water-soluble orthophosphoric acid. Several supports are claimed, including alumina. In the examples of US-A-3 232 887, catalysts A through I are described, all prepared with alumina as a support. The BET surface areas of these catalysts are all above 200 $m^2/g$. Moreover, as the values of 950° F. and 1250° F. are described as calcination temperatures, it is obvious that calcining at these temperaturres results in a support consisting substantially of gamma-alumina with some traces of delta-alumina.

US-A-4 471 144 (Arena) discloses theta-alumina as a hydrothermally stable support in hydrogenation processes, more in particular a method for hydrogenating a carbohydrate in aqueous solution to its polyols, using a catalyst consisting essentially of zero-valent ruthenium dispersed on theta-alumina. Apart from the fact that ruthenium is disclosed, the hydrothermal stability of the theta-alumina is highlighted since the process takes place in aqueous solution and this capacity of the theta-alumina is consequently essential for the process described.

The present invention provides novel catalysts containing 5-40% ww of nickel, an active nickel surface area between 80 and 300, preferably 100 $m^2/g$ of nickel and wherein the transition alumina satisfies the following X-ray diffraction pattern:

| d ($10^{-10}$ m) | I/Io |
| --- | --- |
| 1.39 | 100 |
| 2.85 | 75–85 |
| 2.72 | 60–80 |
| 2.43 | 70 |
| 2.01 | 45–80 |

This diffraction pattern is considered typical for theta-alumina. Preferably the BET-total surface area of the novel catalyst is between 60 and 200 $m^2/g$ catalyst.

In order to make sure that the nickel is readily available for hydrogenation reactions, the transition alumina is preferably substantially free from pores with a radius below 2.0 nm.

The contribution of pores with a radius below 2 nm to the total pore volume is virtually zero. More preferably the catalyst has a pore size distribution substantially between 3.5 and 30 nm, rather between 4.0 and 20 nm.

The catalyst may contain one or more promoters selected from the group consisting of Mo, V, Ce, La, Ba, Ca, Zn or Mg in an amount of 0.2–2.0 mole percent.

It has now been found that catalysts having an excellent selectivity and activity can be prepared by impregnating shaped theta-alumina particles with an ammoniacal metallic solution having a particularly high pH value, namely between 9 and 11, and subsequently evaporating the impregnated alumina particles to dryness, calcining and reducing.

The impression exists that better properties are connected with a very fine dispersion of the active phase and a decreased formation of a metal of Group VIII, in particular nickel, aluminate, which metal aluminates are catalytically inactive.

During the evaporation of the impregnated carrier material to dryness, ammonia gas escapes, as a result of which the pH of the liquid drops.

If, in the ammoniacal metal solution, considerable amounts of anions of stronger acids occur, particularly of strong mineral acids, such as sulphuric acid and nitric acid, it can then be expected that these will bring about an important reduction of the pH, not only during the evaporation but already in the starting pH. It is therefore recommendable that the impregnation liquid (in the present case the ammoniacal metal solution) be completely or substantially free of anions which are derived from acids stronger than carbonic acid and particularly be free, or substantially free, of anions of strong mineral acids and free of anions strongly binding to transition metals such as anions of organic acids.

The ammoniacal metal solution can be prepared by dissolving Group VIII metal, more in particular nickel carbonate, in concentrated ammonia whilst refluxing and subsequent addition of ammonium carbonate and/or carbamate.

The present invention provides a novel, highly active catalyst with a well dispersed active phase. These catalysts are very active for application in hydrogenolytic processes, even when the catalysts contain low percentages of metal(s).

In practical situations the catalyst is applied in fixed bed, therefore the carrier material is best in the form of shaped particles, especially material, in which the cross-section of the carrier particles has a polylobal shape, having concave or convex surfaces, more in particular trilobal and quadrulobal material is preferred.

In another embodiment of the invention a process is provided for hydrotreating unsaturated hydrocarbons, in which unsaturated hydrocarbons are treated with hydrogen in the presence of a catalyst as described above more in particular the invention provides a process which a petroleum distillates are treated and aromatic hydrocarbons therein are at least partly hydrogenated.

Hydrogenation processes according to the present invention are particularly useful for the preparation of white oils in which a high boiling (b.p. 200°–600° C.) hydrocarbon is in a first step hydrotreated with a supported nickel/molybdenum or supported cobalt-/molybdenum catalyst (as according to DE-A-3 221 076 (BASF) in the first step) and subsequently hydrotreated (hydrogenolysis) with a catalyst according to the present invention. White oils are colourless and odourless low-aromatic or aromatic free mineral oil products boiling in the range of heavy gas oils, vacuum gas oils and residual oils. With respect to different quality requirements, they find application in the plastics, food, cosmetics and pharmaceutical industries.

Hydrogenation processes according to the present invention are also very useful for solvent hydrogenation in which a refined petroleum fraction with a boiling range between 100° and 250° C. is hydrotreated with a catalyst as defined above. Applications of such solvents include: as diluent for inks, paints, insecticides, cleansing product manufacture, as an extracting solvent in chemical, pharmaceutical, cosmetics and food industries.

EXAMPLES 1–4

Figure 1:
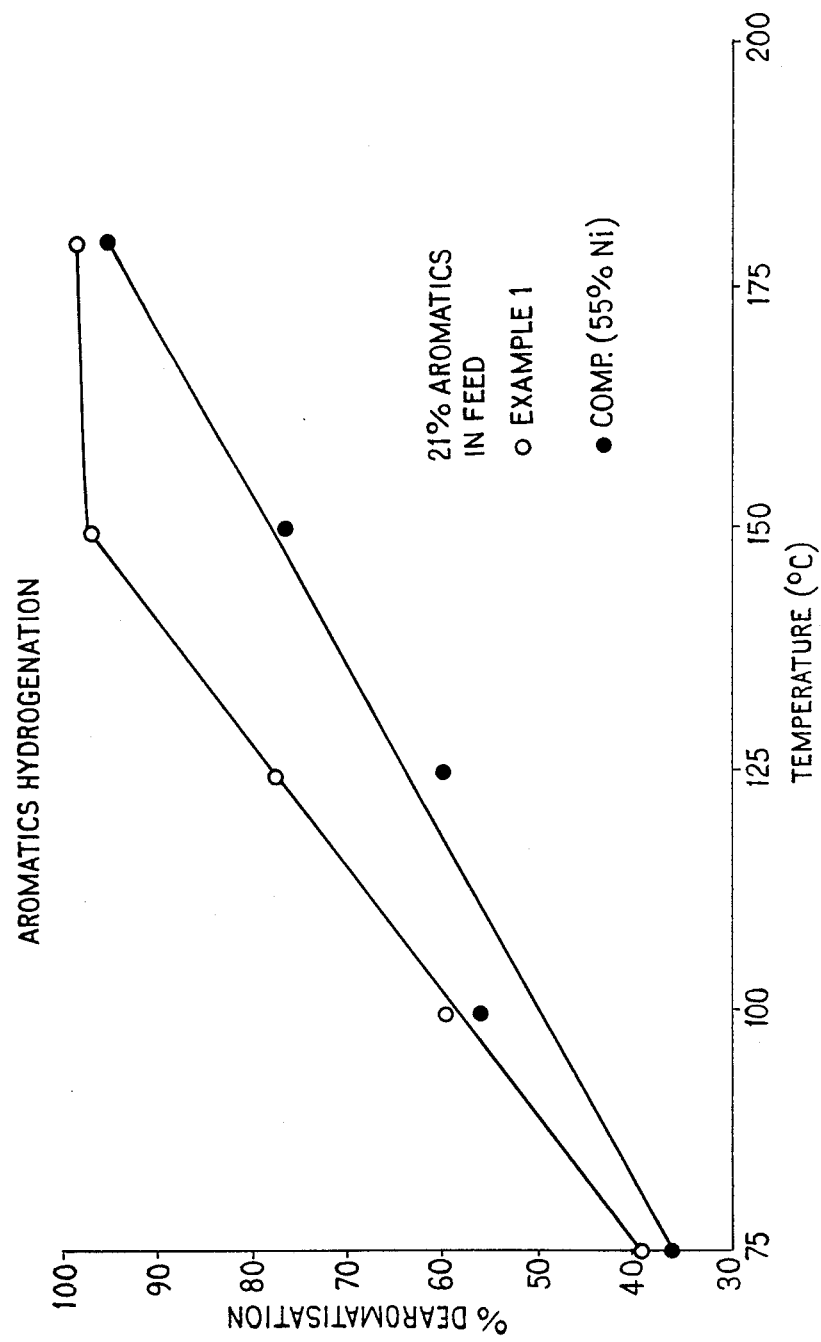
FIGS. 1 and 2 are graphs illustrating the results obtained using the catalyst of the invention.

A commercially available gamma-$Al_2O_3$ extrudate (trilobe; 1.3 mm diameter; 265 $m^2$/g BET surface area) was calcined for 2 hours at 1050° C., yielding predominantly theta-$Al_2O_3$ as evidenced by X-ray diffraction; the BET surface area was reduced to ca. 100 $m^2$/g. The pore volume of these theta-$Al_2O_3$ extrudates was impregnated by submersion in a nickel-containing solution (approximately twice the total pore volume was used) for 5 to 10 minutes. The impregnating solution was prepared in the following way:

In 1 liter of 25% $NH_4OH$ solution in water, 176 g of ammonium carbaminate ($NH_4CO_2NH_2$) and subsequently 235 g of nickel hydroxycarbonate (46–49% Ni) were added slowly. The mixture was heated very carefully to approximately 50° C. and refluxed for 3 hours at this maximum temperature or slightly below. The resulting nickel complex solution contains $(NH_3)_6NiCO_3$ at a concentration of 0.112 g Ni/ml or 0.142 g NiO/ml). The solution was applied as such as described above or used after filtration, centrifuging or decanting to remove traces of precipitates yielding ca. 0.135 g NiO/ml.

After impregnation of the extrudates, these are filtered and the filtrate collected for re-use. Drying was performed at ca. 120° C. for several hours. The dry catalyst is calcined at 300°–350° C.

The calcination step caused a better recovery of pore volume than drying alone, and resulted in higher nickel content of the catalyst after subsequent impregnation steps. Typically, nickel contents of 11–17% nickel were obtained after three impregnation steps (see Table I). Nickel contents were determined by X-ray fluorescence spectroscopy; internal surface area, pore volume and pore radii by nitrogen physisorption, nickel surface area by $H_2$-chemisorption and degree of reduction of the reduced catalyst determined by measuring $H_2$ evolution after submersion in 5N $H_2SO_4$ at increased temperatures.

The catalysts were reduced in $H_2$ at 500° C. maximum temperature and passivated in nitrogen flow containing 0.05% $O_2$ at ambient to 80° C. temperature, increasing the $O_2$ content slowly to 20%.

TABLE I

| Example | Ni (wt. %) | DR (%) | $S_{Ni}$ ($m^2$/g Ni tot) | CS nm | RP nm | BET $m^2$g cat. |
|---|---|---|---|---|---|---|
| 1 | 12.6 | 83 | 174 | 2.1 | 10.1 | 80 |
| 2 | 14.2 | 75 | 184 | 1.8 | 7.4 | 99 |
| 3 | 13.0 | 85 | 198 | 1.9 | 7.5 | 110 |
| 4 | 16.2 | 88 | 164 | 2.3 | 10.3 | 77 |

DR = Degree of Reduction as determined by measuring the $H_2$ evolution from the reaction of the Ni° present in the weighed sample with 5N $H_2SO_4$ using the burette to which the same glass vessels used for chemisorption measurements were connected.
CS = Crystallite Size (= diameter), calculated from active nickel surface area.
RP = Average Pore Radius as calculated from nitrogen physisorption measurements.
$S_{Ni}$ = Active nickel surface area as determined by hydrogen chemisorption at 760 m.bar.
(General methodology, R.Z.C. van Meerten et al., Surface Science 135 (1983) 565 ff).

APPLICATION TESTING

1. A feedstock characterized by the following parameters: boiling range 157°–193° C.; density 0.78 (15° C.); 21% aromatics; sulphur content 1 mg/kg, was hydrogenated using a catalyst prepared according to Example 1 under the following conditions:

| Pressure | 40 bar |
|---|---|
| $H_2$/oil | 175 ml/ml |
| temperature | 75–180° C. |
| LHSV | 4 $h^{-1}$ |

| | |
|---|---|
| -continued | |
| catalyst volume | 9 ml |

The results are summarized in FIG. 1. As a reference, a standard co-precipitated and extruded 55% Ni/Al$_2$O$_3$ catalyst was used; at 150° C., e.g. the relative activity of the catalyst prepared according to this example with respect to the reference was 395% (at 125° C.: 180%).

(calculated:

$$RWA^* = \frac{(C_A \text{ sample})^{1-n} - (C_A)^{1-n}}{(C_A \text{ ref})^{1-n} - (C_A)^{1-n}} \times 100\% \ (n \ 1.3)$$

2. A technical white oil feedstock containing 2.7% aromatics and 75 ppm sulphur; flashpoint 227° C.; viscosity 272.0 m$^2$/s and a UV absorption at 275 nm of 83 was treated over a catalyst prepared according to Example 2 at an LHSV of 1.5 h$^{-1}$; H$_2$/oil=175 Nm$^3$/m$^3$; 95, 70 and 40 bar pressure, at 200° C., 175° C. and 150° C. at each pressure; catalyst volume 9 ml (crushed particles with 6 g SiC diluent).

Figure 2:
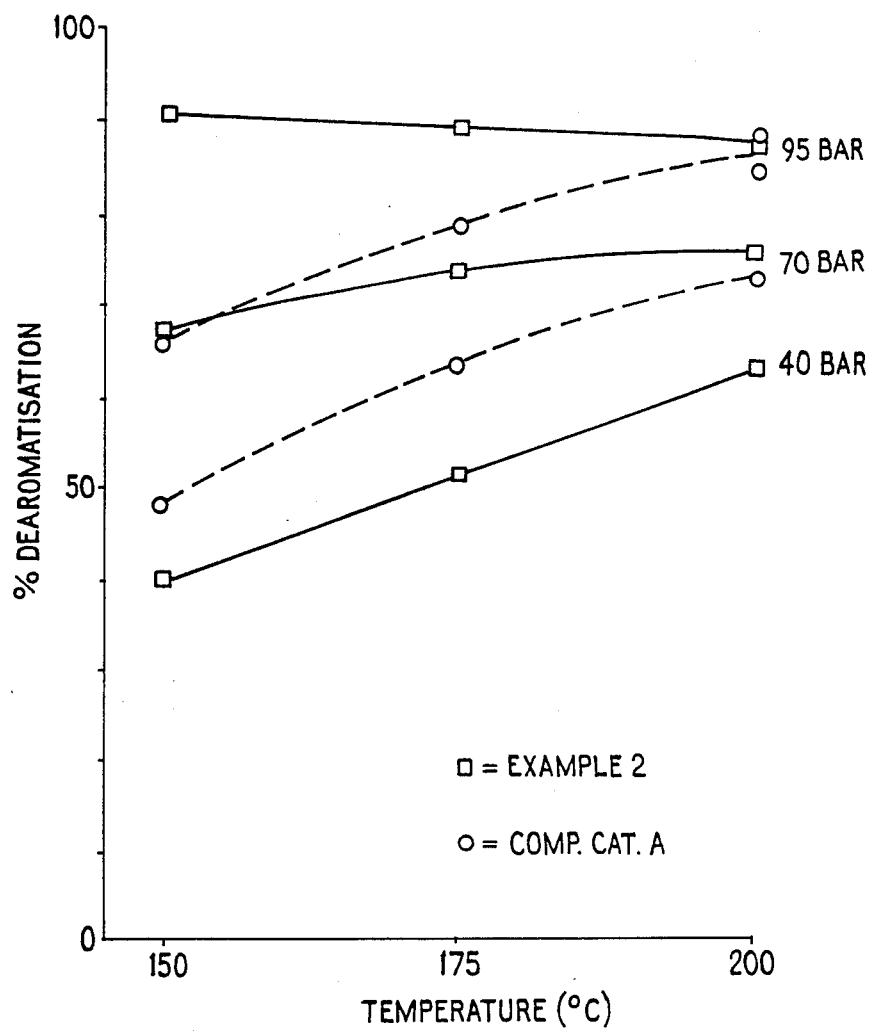

As a reference, a catalyst prepared according to DE-A-3 221076 (BASF) was used. The results are summarized in FIG. 2. At 95 bar pressure and 150° C. the relative activity of the claimed catalyst with respect to the reference was 260% (at 175° C.: 160%).

(calculated as follows:

$$RWA^* = \frac{(C_A \text{ sample})^{1-n} - (C_A)^{1-n}}{(C_A \text{ ref})^{1-n} - (C_A)^{1-n}} \times 100\% \ (n \ 1.3)$$

*RWA = Relative Weight Activity

EXAMPLE 5

A technical white oil (C-oil) characterized by a UV-absorption value at 275 nm of 105; containing 7 ppm sulphur and 2.7% aromatics; having a density (at 15° C.) of 885 kg/m$^3$; a viscosity of 325 m$^2$/g at 20° C.; and a flash point of 236° C., was hydrogenated, applying a catalyst prepared according to Example 3. The catalyst bed volume was 79 ml diluted with 265 g of silicon carbide particles with a diameter of 1 mm. The liquid hourly space velocity was 0.15 h$^{-1}$; H/oil ratio 1000 Nm$^3$/m$^3$; the pressure 200 bar; and the temperature 220° C.

The ódourless, colourless, substantially sulphur-free product obtained after several days equilibration was characterized by Table II. This table indicates no viscosity loss in the product and also that the product both passed the Hot Acid Carbonisable Substances test and is within the limits for UV-absorption (indicated in the table) according to DAB 8 (German Pharmacopoeia 8th edition).

TABLE II

| | |
|---|---|
| Density at 15° C. (kg/m$^3$) | 883 |
| Viscosity at 20° C. (m$^2$/g) | 323 |
| Acid test DAB 8 | pass |
| U.V.—A | |
| 275 nm (limit 1.6) | 1.24 |
| 295 nm (limit 0.2) | 0.07 |
| 300 nm (limit 0.15) | 0.05 |

I claim:

1. A nickel upon transition alumina catalyst containing 5-40% ww of nickel, with an active nickel surface area between 80 and 300 m$^2$/g of Ni, characterized in that the transition alumina is substantially free for pores with a radius below 2.0 nm, has a pore size distribution substantially between 3.5 and 30 nm, and satisfies the following x-ray diffraction pattern:

| d (10$^{-10}$ m) | I/Io |
|---|---|
| 1.39 | 100 |
| 2.85 | 75–85 |
| 2.72 | 60–80 |
| 2.43 | 70 |
| 2.01 | 45–80 |

2. A catalyst according to claim 1, characterized in that the catalyst has a BET-total surface area of between 50 and 200 m$^2$/g catalyst.

3. A catalyst according to claim 1, characterized in that the catalyst has a pore size distribution substantially between 4.0 and 20 nm.

4. A catalyst according to claim 1, characterized in that the carrier material is in the form of shaped particles.

5. A catalyst according to claim 4, in which the cross-section of the carrier particles has a polylobal shape.

* * * * *